(12) United States Patent
Kumar et al.

(10) Patent No.: US 11,846,976 B2
(45) Date of Patent: Dec. 19, 2023

(54) TECHNIQUES FOR STATEFUL PERSISTED SERVICE RESOURCE REDUCTION

(71) Applicant: Microsoft Technology Licensing, LLC, Redmond, WA (US)

(72) Inventors: Yogesh Kumar, Redmond, WA (US); Ankur Jauhari, Redmond, WA (US); Kumar Gaurav Khanna, Bothell, WA (US); Girish Mittur Venkataramanappa, Redmond, WA (US); Nikola Puzovic, Belgrade (RS); Zhengguo Sun, Redmond, WA (US); Manoj Singiresu, Sammamish, WA (US); Ana Trajkovic, Belgrade (RS); Matthew Thomas Snider, Seattle, WA (US); Todd Pfleiger, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 44 days.

(21) Appl. No.: 17/514,440

(22) Filed: Oct. 29, 2021

(65) Prior Publication Data
US 2023/0133608 A1 May 4, 2023

(51) Int. Cl.
*G06F 16/00* (2019.01)
*G06F 16/215* (2019.01)
(Continued)

(52) U.S. Cl.
CPC .......... *G06F 16/215* (2019.01); *G06F 9/5033* (2013.01); *G06F 16/2358* (2019.01)

(58) Field of Classification Search
None
See application file for complete search history.

(56) References Cited

U.S. PATENT DOCUMENTS

| 5,423,037 A | * | 6/1995 | Hvasshovd | ......... G06F 11/2097 |
| 7,885,922 B2 | * | 2/2011 | Pareek | ................ G06F 11/2097 |
| | | | | 707/610 |

(Continued)

OTHER PUBLICATIONS

Rao, et al., "Replicas and Instances in Azure Service Fabric", Retrieved From: https://docs.microsoft.com/en-us/azure/service-fabric/service-fabric-concepts-replica-lifecycle#replica-role, Jan. 10, 2018, 8 Pages.

(Continued)

*Primary Examiner* — Bai D Vu
(74) *Attorney, Agent, or Firm* — NovoTechIP International PLLC

(57) ABSTRACT

A data processing system implements techniques for provisioning and operating databases including receiving a request to provision a new database that includes multiple replicas. The data processing system provisions the new database including the plurality of replicas. The plurality of replicas includes a primary replica, one or more secondary replicas, and one or more delta replicas. The primary replica is configured to handle read and write operations. The one or more secondary replicas include a copy of data and transactional log information of the primary replica and are unable to handle write operations. The one or more delta replicas are a copy of the transactional log information of the primary replica and are unable to handle read operations or write operations.

17 Claims, 10 Drawing Sheets

(51) Int. Cl.
  *G06F 16/23*   (2019.01)
  *G06F 9/50*   (2006.01)

(56) References Cited

U.S. PATENT DOCUMENTS

| | | |
|---|---|---|
| 10,461,991 B1 | 10/2019 | Morley et al. |
| 2006/0090095 A1 | 4/2006 | Massa et al. |
| 2015/0278329 A1* | 10/2015 | Hrle .................. G06F 16/27 707/615 |
| 2018/0096068 A1* | 4/2018 | Venkataramanappa .................... G06F 11/2048 |
| 2018/0246911 A1* | 8/2018 | Lee .................... G06F 16/21 |
| 2018/0246945 A1* | 8/2018 | Lee .................. G06F 11/3476 |
| 2022/0050753 A1* | 2/2022 | Mehta ................ G06F 16/273 |

OTHER PUBLICATIONS

Bernstein, et al., "Adapting Microsoft SQL Server for Cloud Computing", in Proceedings of IEEE 27th International Conference on Data Engineering, Apr. 11, 2011, pp. 1255-1263.

Depoutovitch, et al., "Taurus Database: How to be Fast, Available, and Frugal in the Cloud", in Proceedings of the 27th Annual International Conference on Mobile Computing and Networking, Jun. 14, 2020, pp. 1463-1478.

"International Search Report and Written Opinion Issued in PCT Application No. PCT/US22/045595", dated Feb. 7, 2023, 11 Pages.

* cited by examiner

TECHNIQUES FOR STATEFUL PERSISTED SERVICE RESOURCE REDUCTION

BACKGROUND

Many businesses, governments, universities, and other entities rely on cloud-based computing environments to meet their computing needs. Such cloud-based computing environments may provide these entities with a scalable computing environment for running software utilized with these entities and/or for providing services to customers of these entities. Data storage, access, management, and security are a critical aspect of these cloud-based computing environments, which may be provided by cloud-based database services. Such cloud-based database services may be integrated with cloud-based application services which provide computing resources for implementing and executing cloud-based applications, or the cloud-based database services may be implemented as a separate cloud-base service that provides data storage, access, management, and security for other cloud-based and/or other services that are not cloud-based.

The cloud-based database service may offer service level agreements (SLAs) to customers that provide for uptime guarantees which indicate the availability of the customer's database. To meet these requirements, the cloud-based database service may run multiple replicas of a database for critical applications to eliminate or minimize downtime should an instance of the database go offline. However, such systems require a significant amount of computing resources to support these database replicas. For at least these reasons, the current approaches to providing multilingual support have numerous shortcomings that significantly impact the effectiveness of these approaches. Hence, there is a need for improved systems and methods that provide a technical solution for solving the technical problem of reducing the resources required for supporting such business-critical database systems while continuing to provide the services required by the service level agreement.

SUMMARY

An example data processing system according to the disclosure may include a processor and a machine-readable medium storing executable instructions. The instructions when executed cause the processor to perform operations including receiving a request to provision a database having a plurality of replicas; and provisioning the new database including the plurality of replicas, the plurality of replicas comprising a primary replica, one or more secondary replicas, and one or more delta replicas, the primary replica being configured to handle read and write operations, the one or more secondary replicas comprising a copy of data and transactional log information of the primary replica, the one or more secondary replicas being unable to handle write operations, the one or more delta replicas being a copy of the transactional log information of the primary replica and being unable to handle read operations or write operations.

An example method implemented in a data processing system for provisioning and operating databases includes receiving a request to provision a database having a plurality of replicas; and provisioning the new database including the plurality of replicas, the plurality of replicas comprising a primary replica, one or more secondary replicas, and one or more delta replicas, the primary replica being configured to handle read and write operations, the one or more secondary replicas comprising a copy of data and transactional log information of the primary replica, the one or more secondary replicas being unable to handle write operations, the one or more delta replicas being a copy of the transactional log information of the primary replica and being unable to handle read operations or write operations.

An example machine-readable medium on which are stored instructions. The instructions when executed cause a processor of a programmable device to perform operations of receiving a request to provision a database having a plurality of replicas; and provisioning the new database including the plurality of replicas, the plurality of replicas comprising a primary replica, one or more secondary replicas, and one or more delta replicas, the primary replica being configured to handle read and write operations, the one or more secondary replicas comprising a copy of data and transactional log information of the primary replica, the one or more secondary replicas being unable to handle write operations, the one or more delta replicas being a copy of the transactional log information of the primary replica and being unable to handle read operations or write operations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
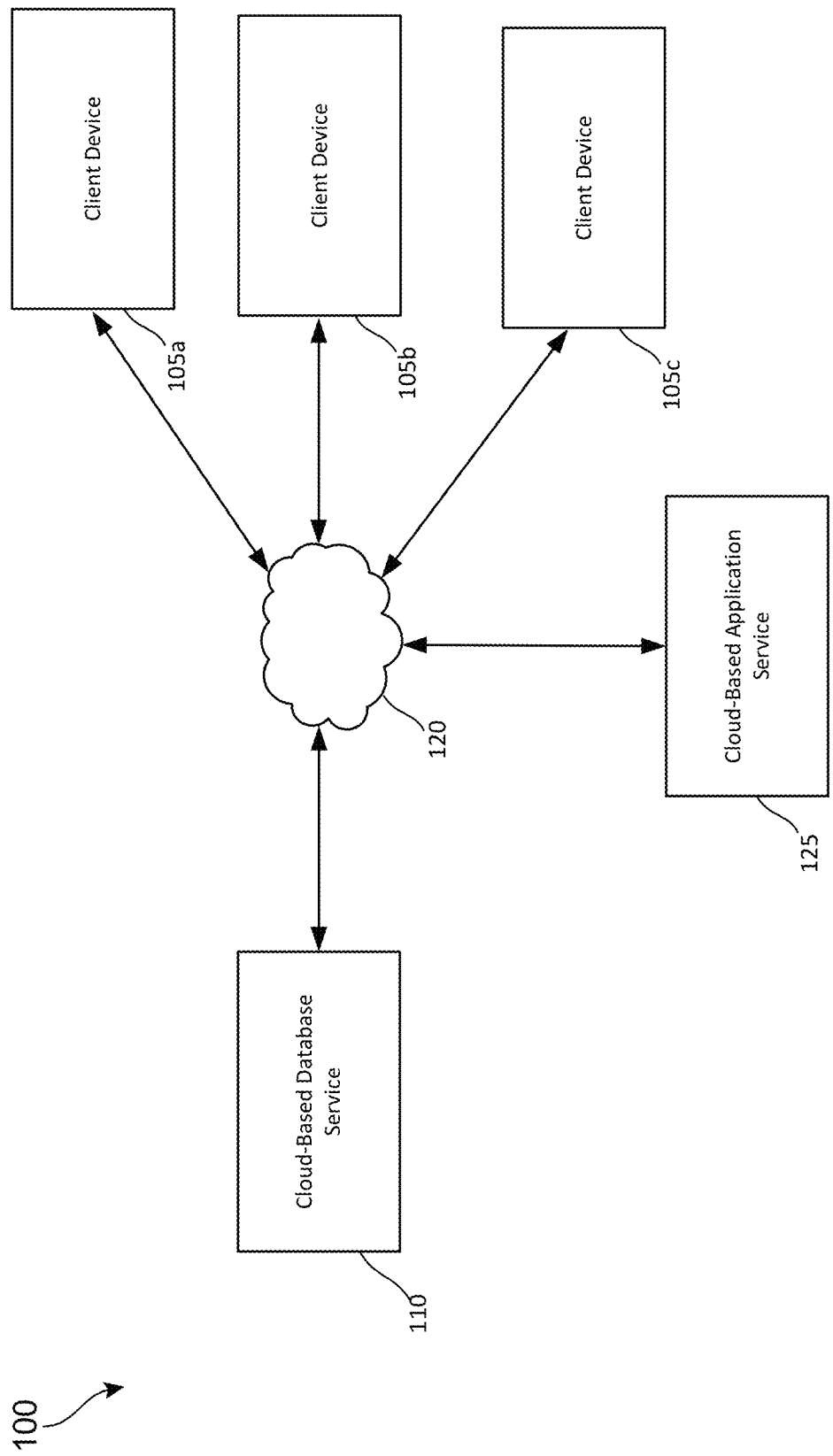
FIG. 1 is a diagram showing an example computing environment in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for stateful persisted service resource reduction are provided herein that support database redundancy requirements for ensuring database availability while reducing the computing resources required to support such redundancy. Current cloud-based database systems provide for redundancy by implementing multiple replicas of a database. One of these replicas is designated as a primary replica and support reading and writing of data to that replica. The remaining replicas are secondary replicas designated as read-only replicas that are continually updated to mirror the contents of the primary replica. The secondary replicas are maintained to ensure that there is at least one replica to serve as a fallback in the event the primary database goes down due to failure or for maintenance. The secondary replicas also provide quorum support for handling write transactions to the primary replica. When a write request is received, the write request must be acknowledged by at least predetermined number of replicas of the set of replicas, or the write transaction cannot be committed. The quorum is required to ensure that no data loss occurs should there be a failure of the primary replica, because the replicas have been kept up to date. A technical problem associated with this approach is that each of the secondary replicas consumes substantially the same computing and storage resources as the primary resources, because the secondary replicas are configured to serve as a fallback replica only if the primary replica experiences a failure. Each of the replicas is allocated the same computing and memory resources as the primary replica. However, most of these replicas will never be required to take over as the primary in the event of a failure. Consequently, a significant amount of computing resources and memory allocated to the second replicas often remain unutilized. The techniques provided herein provide a solution to this problem by utilizing "delta replicas" to replace one or more of the secondary replicas. A delta replica may maintain only the log files that track the changes that have been made to the database, but not the database contents. The use of the delta replica may significantly reduce the computing and storage requirements required to support the replicas while still providing the quorum requirements for ensuring the data integrity in the event of a failure of the primary replica. These and other technical benefits of the techniques disclosed herein will be evident from the discussion of the example implementations that follow.

FIG. 1 is a diagram showing an example computing environment 100 in which the techniques disclosed herein for reducing computing and/or memory resources required to support stateful persisted resources. The computing environment 100 may include a cloud-based database service 110, a cloud-based application service 125, and one or more client devices 105a, 105b, and 105c. The cloud-based application services 125 and the one or more client devices 105a, 105b, and 105c may communicate with the cloud-based database services 110 via the network 120. The network 120 may be implemented by one or more public networks, one or more private networks, or a combination thereof. In some implementations, the network 120 may be implemented at least in part by the Internet.

In the example shown in FIG. 1, the cloud-based database service 110 is implemented as a set of cloud-based services or set of services. The cloud-based database service 110 may be configured to provide a scalable relational database service that provides scalable computing and storage resources. The cloud-based database service 110 may provide data storage, access, management, and security for customers. The customers may require a high level of availability to their data, and the cloud-based database service 110 may utilize replica databases to provide redundancy in the event of failure of the primary database. The cloud-based database service 110 may use delta replicas to reduce the computing and storage resources required support the database replicas. As will be discussed in greater detail in the examples which follow, the delta replicas may maintain transactional log files that track events that alter the contents of the primary replica so that the cloud-based database service 110 may recover from a failure of the primary replica. The transactional log files store a record of write transactions on the primary replica that alter the contents of the database replica. In some implementations, the transactional log file of a replica may be stored as an ".LDF" in a persistent memory of the cloud-based database service 110 allocated to that replica. Additional details of the creation and utilization of the delta replicas is discussed in detail in the examples which follow.

The cloud-based application service 125 may provide one or more cloud-based applications that may utilize the cloud-based database service 110 for data management. The cloud-based application service 125 may implement various types of cloud-based applications, such as but not limited to communications platforms, social media platforms, collaboration platforms, file management platforms, data analysis tools, online stores or exchanges, and/or other types of applications that may generate and/or rely upon large amounts of data and the continued availability, security, and integrity of that data. Whereas the cloud-based application service 125 and the cloud-based database service 110 are shown as separate services in FIG. 1, the functionality of the cloud-based application service 125 may be combined with that of the cloud-based database service 110 to provide a comprehensive platform for implementing cloud-based applications and data storage.

The client devices 105a, 105b, and 105c are computing devices that may be implemented as a desktop computer, a laptop computer, a computer server and/or other type of computing device configured to communicate with the cloud-based application service 125 and/or the cloud-based database service 110 via the network 120. The client devices 105a, 105b, and 105c may by implemented as a portable electronic device, such as but not limited to a smart phone, a tablet computer, and/or other such devices. While the example implementation illustrated in FIG. 1 includes three client devices, other implementations may include different client devices that may utilize the services provided by the cloud-based application service 125 and/or the cloud-based database service 110. Furthermore, in some implementations, the portion of the application functionality provided by the client devices 105a, 105b, and 105c may be implemented by a native application installed on the client devices 105a, 105b, and 105c, and the client devices 105a, 105b, and 105c may communicate directly with the cloud-based database service 110 over a network connection.

Figure 2:
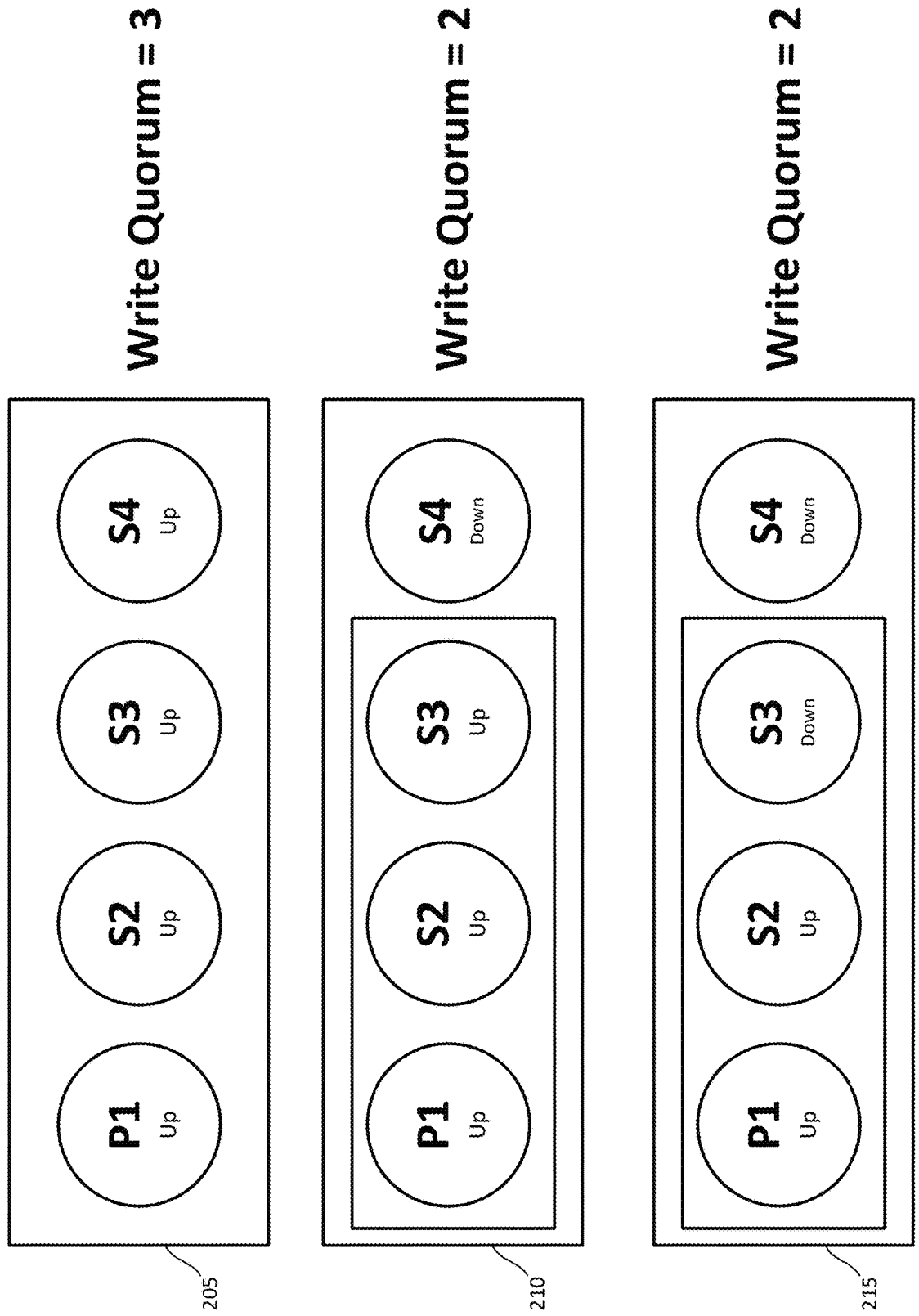
FIG. 2 is a diagram that shows an example configuration that may be implemented by the cloud-based database service shown in FIG. 1.

FIG. 2 is a diagram that shows an example configuration that may be implemented by the cloud-based database service 110 shown in FIG. 1. FIG. 2 shows an example implementation operating without a delta replica. The cloud-based database service 110 may permit provide configuration parameter that may be set when a new database is created by the cloud-based database service 110 associated with the number of replicas to be created for a particular database. In some implementations, these parameters may be automatically configured based on a service level agreement associated with a customer for which the database is being created. The service parameters may include a target replica set size parameter that indicates how many replicas should be created for the database. The service parameters may also include a minimum replica set size parameter that indicates the minimum number of replicas required for quorum commit. The number of active replicas may decrease in response to a replica experiencing a hardware failure or other condition requiring the replica to be shut down. The number of active replicas also decrease in response to a replica being taken down for maintenance or upgrade. If the total number of replicas drops below the majority quorum of the minimum replica count, then further writes will be disallowed.

In the example shown in FIG. 2, a database has been allocated with a target replica size of 4, indicating that there are four replicas of the database to be operating: a primary replica P1, and three secondary replicas S2, S3, and S4. Should the primary replica P1 go down due to hardware failure or other problems, one of the secondary replicas S2, S3, or S4 may be prompted to primary and the former primary P1 is repaired and restarted as a secondary replica. Whereas this example shows three secondary replicas, other implementations may include a different number of secondary replicas. In this example, the database has also been allocated with a minimum replica set size of 3, indicating that if the total number of replicas falls below 3, then further writes will be disallowed.

The primary replica P1 is allocated for handling read-write traffic, and the secondary replicas S2, S3, and S4 are synchronized with the primary replica P1 to provide quorum support. The primary replica P1 processes the read-write requests and generates a transaction log, and the transactional log is propagated to each of the secondary replicas S2, S3, and S4. Once each of the secondary replicas S2, S3, and S4 have accepted the transactional log from the primary replica P1, the primary replica P1 commits the transaction in response to the acknowledgements from the secondary replicas S2, S3, and S4, and the primary replica P1 commits a log truncation after committing the transaction. The primary replica P1 no longer requires the full log once the transaction has been committed and truncates the transactional log. The truncation is then propagated to the secondary replicas S2, S3, and S4. Consequently, the secondary replicas S2, S3, and S4 will include a delta of the transaction log file and not the full translational log file.

One or more of the secondary replicas may also be allocated to handle read-only traffic to take some of the load off the primary replica P1. The secondary replicas may be allocated to handle read-only traffic since the secondary replicas are synchronized with the primary replica P1. Write traffic is not permitted on the secondary replicas to prevent the secondary replicas from becoming unsynchronized with the primary replica P1.

Initially, at a time 205, all four of the replicas are operational. The cloud-based database service 110 may calculate a write quorum value for the database based on the number of operational replicas. In the example shown in FIG. 1, the write quorum may be determined by the following equation:

$$\text{Write Quorum} = \frac{\text{Replica Count}}{2} + 1,$$

where the replica count represents the current number of active replicas of a database. At time 205, there are 4 active replicas, so the write quorum=3. The write quorum rounds down to the nearest integer value.

At time 210, the secondary replica S4 is down. The replica may have failed due to a hardware failure or may have been taken down for maintenance or an upgrade. As a result, the write quorum decreases to two, because the write quorum rounds down to the nearest integer value. Three replicas continue to operate. A sufficient number of replicas are available for quorum and at least one of the secondary replicas may still be allocated for handling read traffic to take some of the load off the primary replica P1.

At time 215, the secondary replica S3 has also gone down. The primary replica P1 and the secondary replica S2 remain operational. The write quorum remains a two, the minimum for maintaining a quorum. The number of active replicas has also fallen below the minimum replica set size. The cloud-based database service 110 will attempt to bring the number of active replicas back to the target replica set size. If neither of the secondary replicas S3 and S4 can be brought back online, the secondary replica S2 may be used as a seed to provision a new replica. However, provisioning a new replica requires the allocation of additional computing and memory resources to provision the new replica. Therefore, restoring an existing replica that has gone down is preferable.

In the example shown in FIG. 2, the quorum is maintained even though a couple of the secondary replicas failed. However, if quorum loss occurred and there were not enough operational secondary replicas to support a write transaction, the database would be taken down. Users would not be able to connect to the database, and the service fabric would take the database down until a sufficient number of replicas can be brought back up to an online state.

Figure 3:
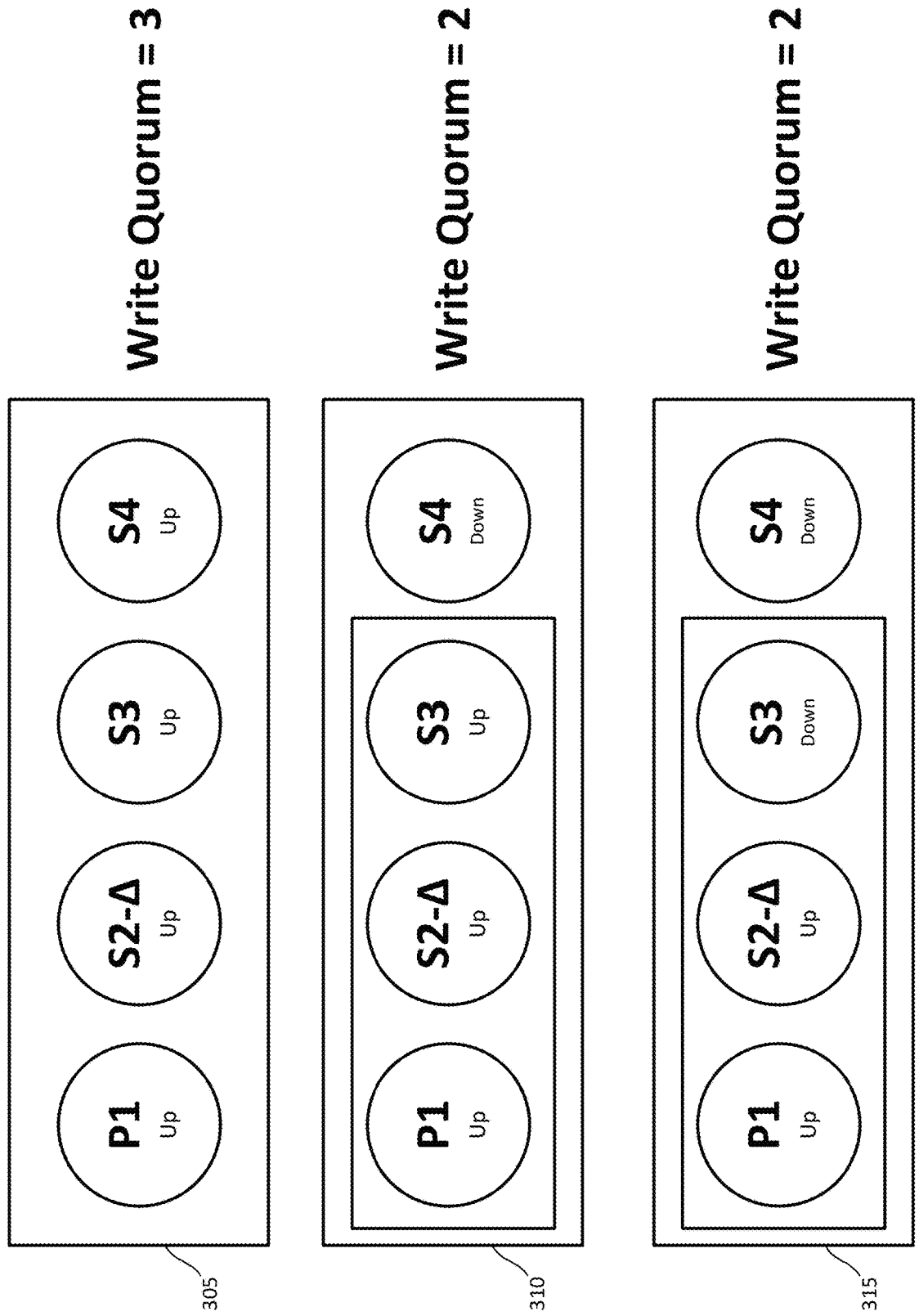
FIG. 3 is a diagram that shows an example configuration similar to that of FIG. 2 that may be implemented by the cloud-based database service but includes a delta replica.

FIG. 3 is a diagram that shows an example configuration similar to that of FIG. 2 that may be implemented by the cloud-based database service 110 but includes a delta replica. The service parameters may also include a parameter indicating a number of delta replicas to be created for the database. The example shown in FIG. 3 includes a single delta replica, but other implementations may include more than one delta replica. The service parameters may specify how may replicas should be created in the target replica set size including delta replicas, and the delta replica set size indicates how many delta replicas of the target replica set size are to be created. Thus, the delta replica set size will be less than or equal to the target replica set size.

In the example shown in FIG. 3, the database has been allocated with a target replica size of 4, indicating that there are four replicas of the database to be operating: a primary replica P1, and three secondary replicas S2-Δ, S3, and S4. The database has also been allocated with a minimum replica set size of 3, indicating that at least three replicas should be kept running. The replica S2-Δ is a delta replica in this example. The primary replica P1 is allocated for handling read-write traffic, and the secondary replicas S2-Δ, S3, and S4 are synchronized with the primary replica P1 to provide quorum support. The primary replica P1 processes the read-write requests and generates a transaction log, and the transactional log is streamed to each of the secondary replicas S2-Δ, S3, and S4.

Unlike the example shown in FIG. 2, only the secondary replicas S3 and S4 may be allocated to handle read-only traffic to take some of the load off the primary replica P1 if the primary replica reaches a predetermined load threshold. This threshold may be configurable for each database and may depend in part how much write traffic and how much read-only traffic is expected for the database. The secondary replicas S3 and S4 may be allocated to handle read-only traffic since the secondary replicas are synchronized with the primary replica P1. However, the delta replica S2-Δ cannot be utilized for either read-write or read-only traffic. The delta replica S2-Δ includes only the transactional log data from P1 and is not a full replica of the data stored in P1. Therefore, the delta replica S2-Δ may be used for quorum support but cannot be utilized for read-only traffic, nor can the delta replica S2-Δ be converted to the primary replica if the primary replica P1 goes down. The secondary replicas S3 and S4 may be converted to the primary replica if the primary replica P1 goes down. However, the delta replica S2-Δ utilizes significantly less computing and storage resources than the secondary replicas S3 and S4. The differences between the allocation of resources of a full secondary replica and a delta replica are discussed in greater detail with respect to FIGS. 4 and 5.

Initially, at a time 305, all four of the replicas are operational. The write quorum is 3 and may be calculated in a similar manner as discussed with respect to FIG. 2. The delta replica S2-Δ counts for quorum purposes, as the delta replica includes the translation log information associated with the primary replica P1 and can be used to recover the state of P1 if necessary.

At time 310, the secondary replica S4 is down. Again, the secondary replica S4 may have gone down due to a hardware failure or may have been taken down for maintenance or an upgrade. As a result, the write quorum decreases to two, because the write quorum rounds down to the nearest integer value. Three replicas continue to operate, including the primary replica P1 and the delta replica S2-Δ. A sufficient number of replicas are available for quorum and the secondary replica S3 may still be allocated for handling read traffic to take some of the load off the primary replica P1. However, the delta replica S2-Δ cannot handle read-only traffic to take some of the load off the primary replica P1.

At time 315, the secondary replica S3 has also gone down. The primary replica P1 and the delta replica S2-Δ remain operational. The write quorum remains a two, the minimum for maintaining a quorum. The number of active replicas has also fallen below the minimum replica set size. The cloud-based database service 110 will attempt to bring at least one of the secondary replicas S3 and S4 back online. If neither of the secondary replicas S3 and S4 can be brought back online, the primary replica P1 and/or the delta replica S2-Δ may be used as a seed to provision a new replica. However, provisioning a new replica requires the allocation of additional computing and memory resources to provision the new replica. Therefore, restoring an existing replica that has gone down is preferable.

Figure 4:
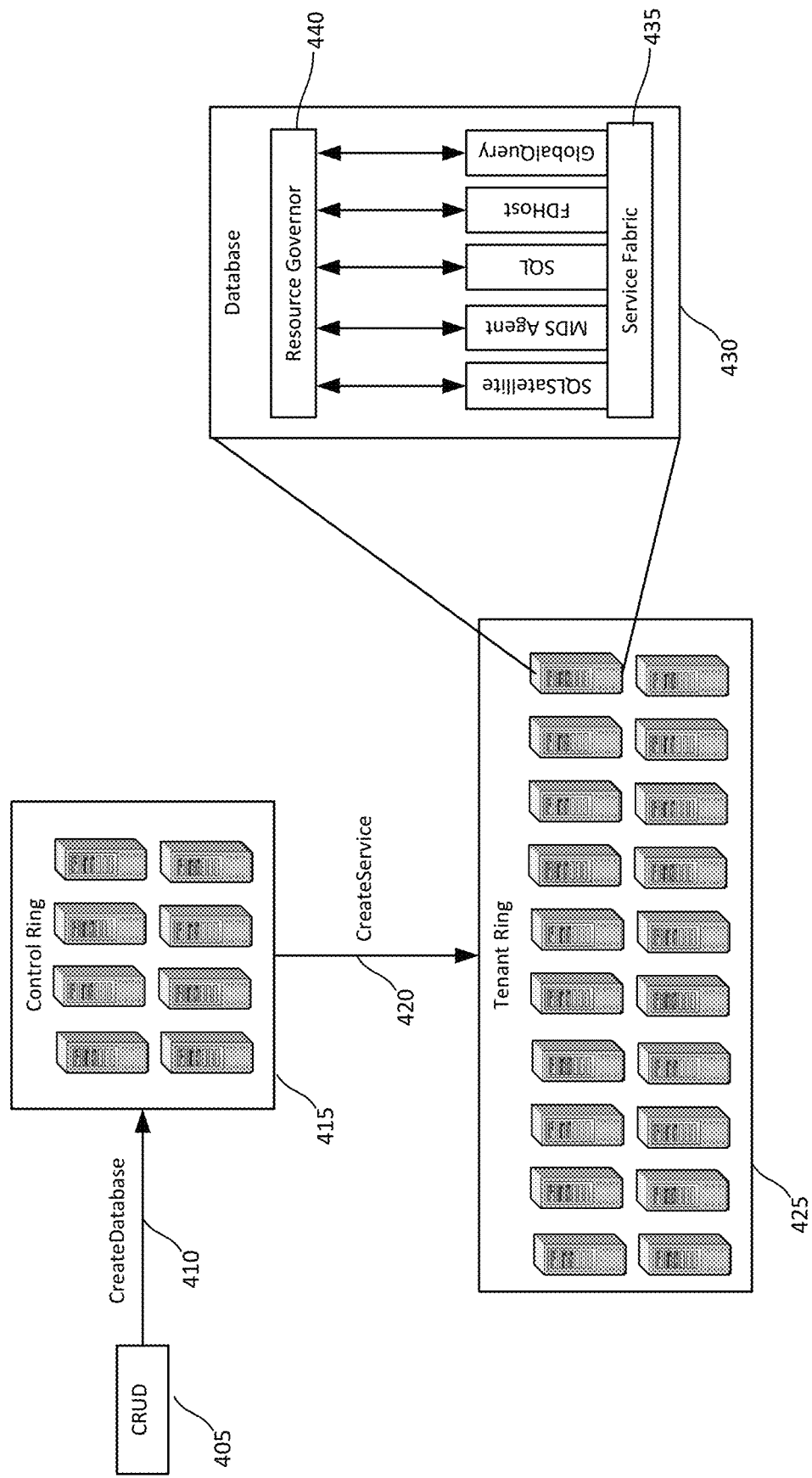
FIG. 4 is a diagram that shows a workflow for creating a database that includes replicas but no delta replicas.

FIG. 4 is a diagram that shows a workflow for creating a database that includes replicas but no delta replicas. The workflow includes a create, read, update, and delete (CRUD) operation 405 which is performed at the cloud-based application service 125 or a client device 105. The CRUD operation 405 includes a create database statement 410. The create database statement 410 may include parameters that indicate a target replica set size and a minimum replica set size as discussed in the preceding examples. The target replica set size indicates how many database replicas should be created for the database, and the minimum replica set size indicates what the minimum number of replicas that should be created for the database before a new replica is provisioned.

The create database statement 410 may be submitted to a control ring 415. The control ring 415 is a set of servers that is configured receive such requests and to forward the requests to cluster of database servers (referred to as a "tenant ring") herein for processing. The control ring 415 identifies a tenant ring 425 that has capacity for the new database. The control ring 415 may have information for a plurality of tenant rings, and the control ring 415 select a tenant ring for the database having sufficient capacity for the database from those tenant rings.

The control ring 415 may send a create service request 420 to the tenant ring 425 in response to selecting the tenant ring 425 from the available tenant rings. The tenant ring 425 includes multiple database clusters. Each database cluster is a collection of two or more physical servers, referred to as nodes, which are connected via a local area network (LAN). The physical servers of the cluster share access to the same shared memory and provide a failsafe in the event one of the nodes in the cluster fails.

The tenant ring 425 may implement a service fabric 435 and a resource governor 440. The service fabric 435 provides support for building stateful services, such as the database replicas described herein. The service fabric 435 may be configured to load balancing among the nodes of the tenant ring 425 and for placement of the replicas on the nodes of the tenant ring 425. The service fabric 435 may launch a set of processes for supporting a database replica on a node. In the example shown in FIG. 4, a single database replica 430 has been implemented on one of the nodes, and a set of processes to support the database replica have been launched. The specific set of processes that support the database replica may depend on the implementation of the cloud-based database service 110. The example shown in FIG. 4 may be implemented using Microsoft Azure SQL Database service, and the example processes are associated with Azure SQL Database services. However, other implementations may be implemented by other database services.

The resource governor 440 is configured to control the allocation of resources, such as memory and other computing resources on the nodes of the tenant ring 425. The resource governor 440 can set resource limits on the memory and other computing resources that may be provided to the database replica and the processes set up by the service fabric 435. The resource governor 440 allocates the same resources for the each of the database replicas requested by the create database statement.

The service fabric 435 may instantiate the remaining requested database replicas on other nodes of the tenant ring 425. The resource governor 440 may then allocate the requested resources for each of the database replicas. The service fabric 435 may then configure one of the database replicas as the primary replica, and the rest of the database replicas as the secondary replica.

Figure 5:
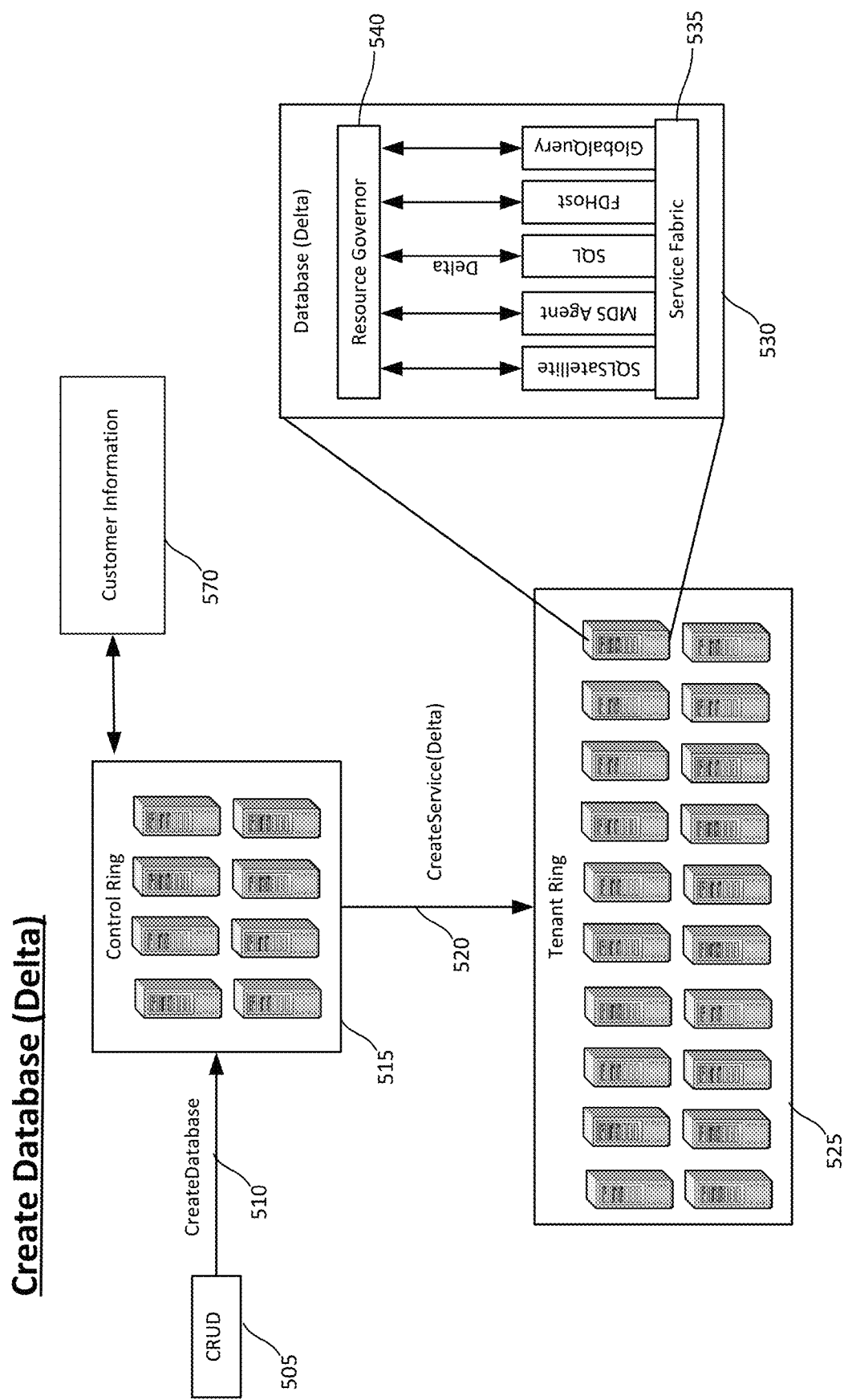
FIG. 5 is a diagram that shows a workflow for creating a database that includes at least one delta replica.

FIG. 5 is a diagram that shows a workflow for creating a database that includes at least one delta replica. FIG. 5 highlights the differences in the workflow for provisioning a delta replica versus a standard database replica.

The workflow show in FIG. 5 includes a create, read, update, and delete (CRUD) operation 505 which includes a create database statement 510, similar to the CRUD operation 405 and the create database statement 410 shown in FIG. 4. The create database statement 510 may include parameters that indicate a target replica set size and a minimum replica set size as discussed in the preceding examples similar to that of the create database statement 410.

The create database statement 510 may be submitted to the control ring 515, which is similar to the control ring 415 shown in FIG. 4, and the control ring 515 may send a create service request 520 to the tenant ring 525.

The control ring 515 identifies a tenant ring 525 that has capacity for the new database. The tenant ring 525 is similar to the tenant ring 425 shown in FIG. 4. The control ring 515 may have information for a plurality of tenant rings, and the control ring 515 select a tenant ring for the database having sufficient capacity for the database from those tenant rings. The control ring 515 may be configured to determine that the database to be created may include one or more delta replicas. The create database request does not include a reference to the number of delta replicas. Instead, the control ring 515 may determine a service level associated with a customer associated with the request to create the database. The control ring 515 may access the customer information 570 to determine the service level to be provided to the customer. Some service levels may permit the use of delta replicas, while other may not permit the use of delta replicas. The control ring 515 may be configured to determine how many delta replicas may be utilized for the new database based on this service level information.

The control ring 515 may take into account the number of delta replicas that may be provisioned for the new database when identifying a tenant ring 525 having sufficient capacity for handling the new database. The amount of computing resources required for a delta replica may be significantly less than for a standard replica, since the delta replica will only include the transactional log files propagated by the primary and other minimal files required to maintain the delta replica. Thus, the delta replica may require significantly less storage and computing resources that a typical secondary replica of the database, which consumes approximately the same amount of storage and other computing resources as the primary replica.

The create service request 520 to the tenant ring 525 may specify the number of replicas and delta replicas to be created for the database. The number of delta replicas may be less than or equal to the target replica set size. However, if all the secondary replicas for a database are delta replicas, none of the secondary replicas will be able to be promoted to become the primary replica if the primary replica goes down due to a hardware failure or other such problem. Thus, at least one secondary replica that is a standard replica and not a delta replica is desirable for implementations in which minimizing down time and rapid recovery of the database functionality is required.

The tenant ring 525 may implement a service fabric 535 and a resource governor 540, like the service fabric 435 and the resource governor 440 shown in FIG. 4. The service fabric 535 may be configured to initiate only those processes required to support the delta replica 530 rather than all the processes which would typically be required to support a full secondary replica. Furthermore, the resource governor 540 may be configured to recognize that the replica 530 is a delta replica and that allocated reduced resources for supporting the replica than would have been allocated for a full secondary replica. A technical benefit of this approach is that the quorum requirements for ensuring data integrity may be satisfied without having to allocate the full resources to each of the delta replicas. This reduction in computing resources may be significant for a single database running multiple copies but may be even more significant for a cloud-based database service, such as the cloud-based database service 110, which may be running large numbers of databases having multiple replicas.

The service fabric 535 may instantiate the remaining requested database replicas on other nodes of the tenant ring 525. The resource governor 540 may then allocate the requested resources for each of the database replicas. The service fabric 535 may then configure one of the database replicas as the primary replica, and the rest of the database replicas as the secondary replicas. The service fabric may then route read-write request so the primary replica and may route read-request to one or more of the secondary replicas that are not delta replicas. The service fabric may determine that the load on the primary replica is above a predetermined threshold before checking the capacity of the one or more secondary replicas. The service fabric may select a secondary replica to receive read-only requests from a customer and route the read-only requests to the appropriate node of the tenant ring 525 on which the selected secondary replica is operating.

Figure 9A:
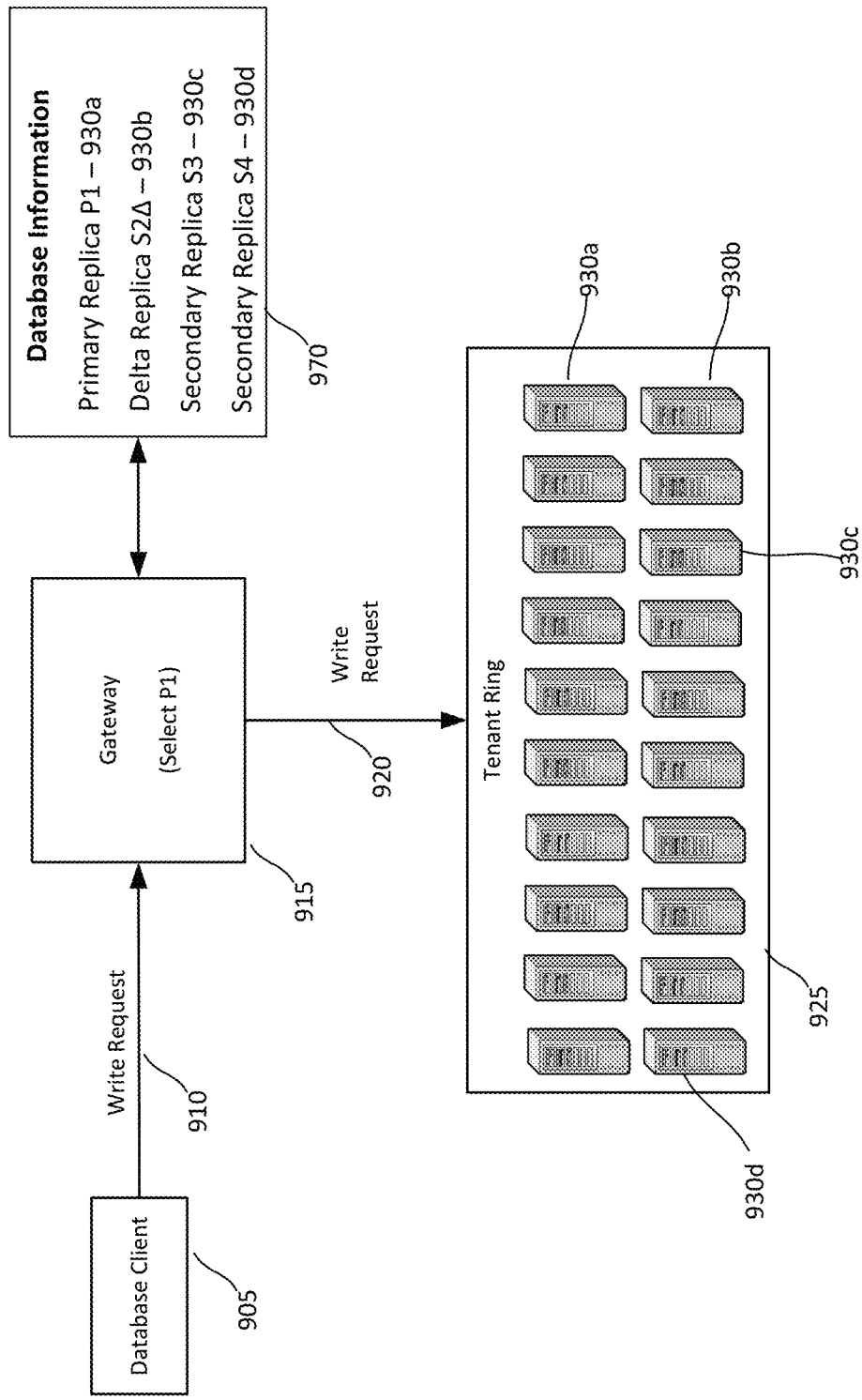
FIG. 9A is a diagram showing how a write request may be processed in the cloud-based database service shown in the preceding figures.

FIG. 9A is a diagram showing how the write request may be processed in the cloud-based database service 110 shown in the preceding figures. A write request 910 may be received from a database client 905. The database client may be a client device 105 or the cloud-based application service 125. The database client 905 may initially send the write request to the gateway 915. The gateway 915 may be configured to have a public internet protocol (IP) address and be configured to listen for connection requestion from clients on a particular port. The gateway is configured to redirect traffic to the proper database cluster. The gateway may be implemented by the control ring 415 or control ring 515 described in the preceding examples.

In the example shown in FIG. 9A, the database associated with the request includes four replicas: primary replica P1 930a, delta replica S2Δ 930b, secondary replica S3 930c, and secondary replica S4 940d. Each of the replicas are located on a different node of the tenant ring 925. Only the primary replica P1 930a may serve write requests. The gateway is configured to only redirect write requests to the appropriate replica.

The database client 905 submits a write request 910 to the gateway. The write request 910 may include a database identifier, and the gateway 915 may be configured to translate this information to the correct tenant ring 925. The tenant ring 925 represents a cluster of database nodes that may be configured to provide computational and storage resources. The tenant ring 925 may be similar to the tenant rings shown in the preceding examples. The gateway also may access database information 970 and look up database information for the databases associated with incoming requests. The database information 970 may indicate how many replicas that a specified database includes and the types of replicas. The database information 970 may be updated as database replicas associated with a database are brough online or go offline. This information may be updated by the service fabric of the tenant ring 925 as the replicas associated with a database come online or go offline.

The gateway may then send a write request 920 based on the write request 910 to the tenant ring 925. The write request 920 may specify the node of the primary replica P1 930*a* in the tenant ring 925. The service fabric may route the write request 920 to the correct node in the tenant ring for processing. As discussed above, write requests require quorum thresholds to be satisfied. In this example, at least one of the delta replica S2Δ 930*b*, the secondary replica S3 930*c*, and the secondary replica S4 940*c* may serve to meet the quorum requirements. The primary replica P1 930*a* will propagate the transaction log information to the delta replica S2Δ 930*b*, the secondary replica S3 930*c*, and the secondary replica S4 940*d*. The delta replica S2Δ 930*b*, the secondary replica S3 930*c*, and the secondary replica S4 940*d* send acknowledgements to the primary replica P1 930*a*. The write transaction may then be committed and the database client 905 notified that the transaction has completed.

Figure 9B:
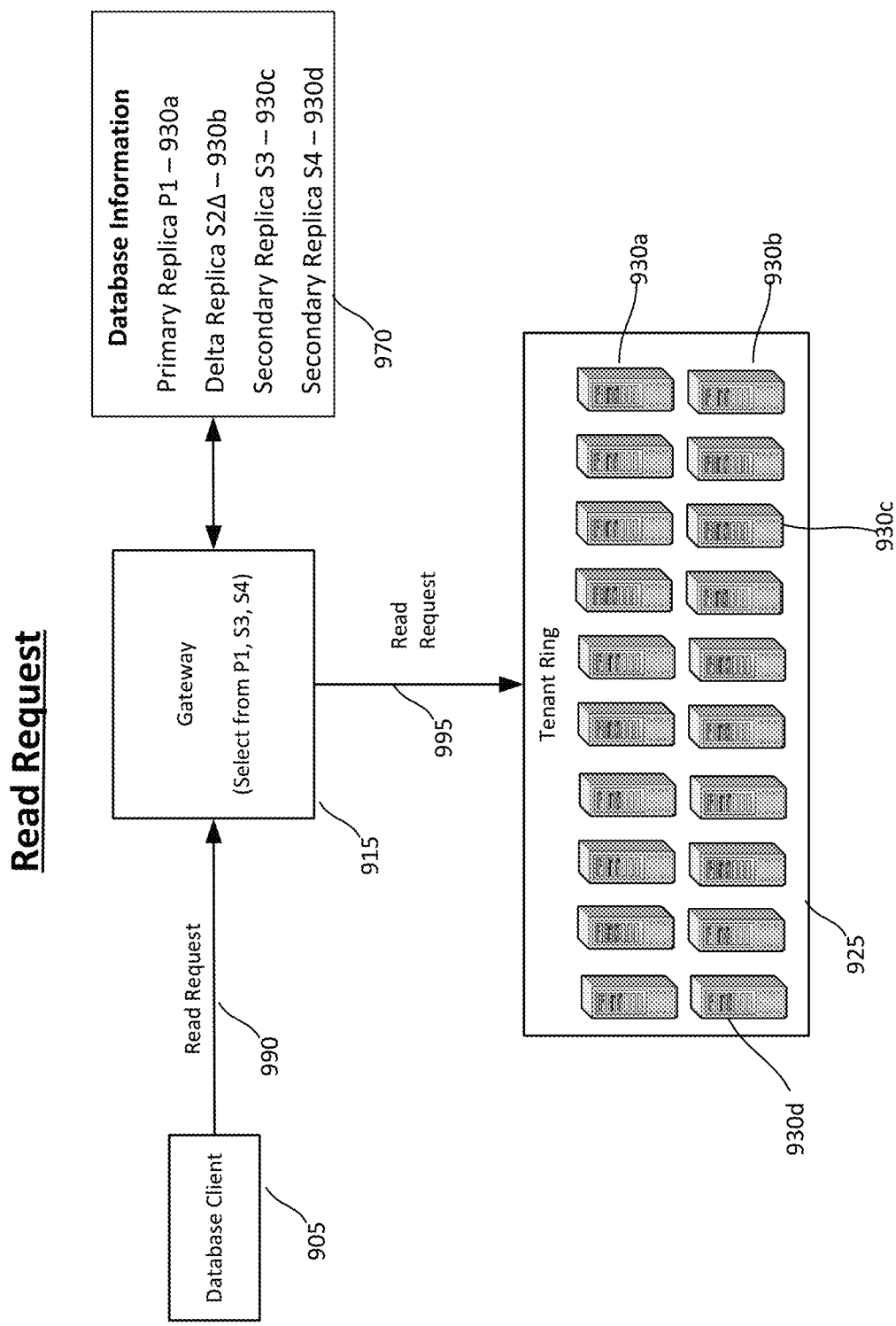
FIG. 9B is a diagram showing how a read request may be processed in the cloud-based database service shown in the preceding figures.

FIG. 9B is a diagram showing how the read request may be processed in the cloud-based database service 110 shown in the preceding figures. A read request 990 may be received from the database client 905. The database client 905 may initially send the read request 990 to the gateway 915. The gateway 925 may access the database information 970 to obtain the database information for the database associated with the request. The gateway 925 may determine that three of the replicas may handle read requests: the primary replica P1 930*a*, the secondary replica S3 930*c*, and the secondary replica S4 940*d*. The gateway 925 excludes the delta replica S2Δ 930*b* because delta replicas do not support read requests. The gateway 925 may route the read request 995 to the primary replica P1 930*a* or may select one of secondary replicas. However, if the gateway 995 routes the read request to the primary replica P1 930*a*, the service fabric of the tenant ring may determine whether the current load on the primary replica P1 930*a* exceeds a load threshold. If the load on the primary replica P1 930*a* exceeds the load threshold, then the service fabric may direct the read request to either the secondary replica S3 930*c* or the secondary replica S4 940*d*. The service fabric may select the secondary replica having a lower load to handle the read request. The date read from the database may then be provided to the database client 905.

Figure 6:
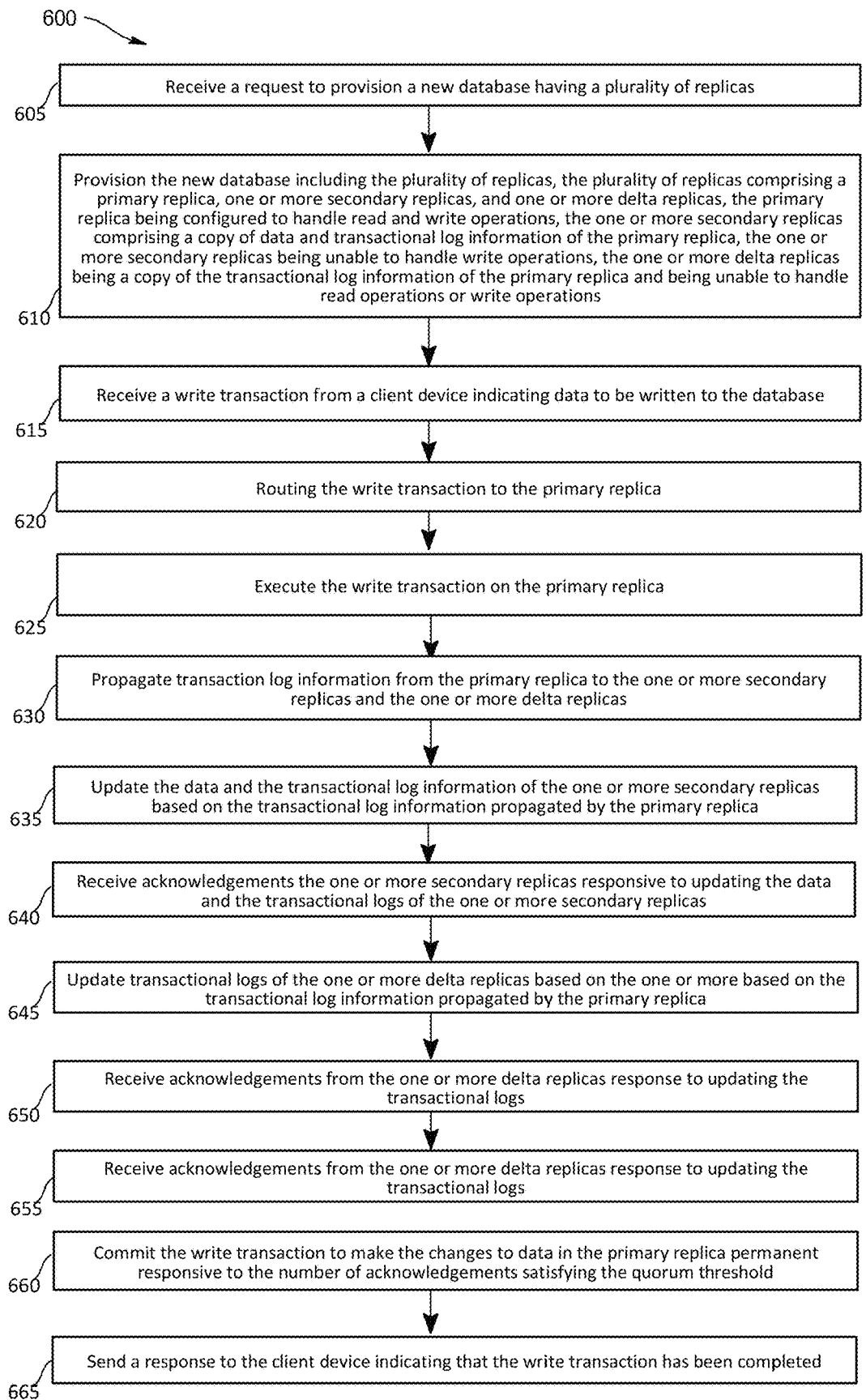
FIG. 6 is a flow diagram of a process for provisioning and operating databases.

FIG. 6 is a flow chart of an example process 600 for provisioning and operating databases that may be implemented by the cloud-based database service 110.

The process 600 may include an operation 605 of receiving a request to provision a database having a plurality of replicas. As discussed in the preceding examples, the request to provision a database may be received at the cloud-based database service 110. The request may originate from a client device 105 or the cloud-based application service 125.

The process 600 may include an operation 610 of provisioning the new database including the plurality of replicas responsive to the request. The plurality of replicas includes a primary replica, one or more secondary replicas, and one or more delta replicas. As indicated in the preceding examples, the primary replica of the database is configured to handle read and write operations. The one or more secondary replicas are a full copy of the primary replica that includes a copy of the data and transactional log information of the primary replica. The secondary replicas are unable to handle to write operations but may be allocated read operations to take some of the load off the primary replica. The one or more delta replicas are a copy of the transactional log information of the primary replica and are unable to respond to read operations or the write operations.

The database may be provisioned as shown in FIGS. 4 and 5. The primary replica and the one or more secondary replicas are full copies of the database, while the one or more delta replicas include just the transaction logs and may be used to preserve the quorum if one or more of the secondary replicas go down. Thus, a secondary replica of the one or more secondary replicas may be prompted to the primary replica if the primary replica goes down, but a delta replica may not be promoted to the primary replica because the delta replica includes only the transaction logs and not the database content.

The process 600 may include an operation 615 of receiving a write transaction from a client device indicating data to be written to the database, and operation 620 of routing the write transaction to the primary replica. When a write transaction is received, the control ring 515 routes the request to the appropriate tenant ring 525 on which the database has been provisioned. The service fabric implemented at the tenant ring 525 then provides the write request to the node on which the primary replica has been provisioned.

The process 600 may include an operation 625 of executing the write transaction on the primary replica. The primary reference may then execute the write transaction on the primary replica. However, the transaction may not be committed until quorum requirements for the write transaction are satisfied. The quorum requirements indicate that the write must be acknowledge by a set of replicas before the transaction may be committed. As discussed in the preceding examples, the replicas used to satisfy the quorum requirements may be a secondary replicas or delta replicas. The quorum requirements ensure that in the event of a failure of the primary replica there is no data loss. A secondary replica may be promoted to the primary replica in the event of the current primary replica failing. The promoted secondary replica should be able to continue operating with the same log sequence number (LSN) as the former primary replica that failed. The service fabric of the tenant ring 525 may select the secondary replica to promote to the primary replica if the primary replica goes does. The service fabric may select the secondary replica based on the load of the node on which the secondary replica is operating and/or other factors.

The process 600 may include an operation 630 of propagating transaction log information from the primary replica to the one or more secondary replicas and the one or more delta replicas. The primary replica propagates the transaction log indicating the changes that were made to the primary replica by the write transaction to both the secondary replicas and the delta replicas.

The process 600 may include an operation 635 of updating the data and the transactional log information of the one or more secondary replicas based on the transactional log information propagated by the primary replica. The secondary replicas update their respective copies of the database data so that the secondary replicas remain synchronized with the primary replica.

The process 600 may include an operation 640 of receiving acknowledgements from the one or more secondary replicas responsive to updating the data and the transactional logs of the one or more secondary replicas. Each secondary replica that completes the write transaction sends an acknowledgement to the service fabric and/or the primary replica indicating that the respective secondary replica has been updated to keep the secondary replica synchronized with the primary replica.

The process 600 may include an operation 645 of updating transactional logs of the one or more delta replicas based on the transactional log information propagated by the primary replica. The delta replicas are not full replicas of the primary replica. The delta replicas are used for quorum purposes and store the changes that were made to the primary replica in the transactional log information.

The process 600 may include an operation 650 of receiving acknowledgements from each of the one or more delta replicas response to updating the transactional logs. Each of the delta replicas may be configured to send an acknowledgement once the transactional logs have been updated. No data corresponding database data update is performed because the delta replicas do not include a full copy of the database.

The process 600 may include an operation 655 of determining that a number of the acknowledgements received from the one or more secondary replicas and the one or more delta replicas satisfies a quorum threshold. The quorum threshold may be determined as indicated in the preceding examples. Both the secondary replicas and the delta replicas may support the quorum, and the acknowledgements from both the secondary replicas and the delta replicas may be counted to determine whether the quorum threshold has been met for the database.

The process 600 may include an operation 660 of committing the write transaction to make the changes to data in the primary replica permanent responsive to the number of acknowledgements satisfying the quorum threshold. Once the quorum has been achieved, the write transaction may be committed to make the changes to data in the primary replica permanent.

The process 600 may include an operation 665 of sending a response to the client device indicating that the write transaction has been completed. The client device 105 or the cloud-based application service 125 from which the write request originated may be notified that the write transaction has been completed. An application on the client device 105 or the cloud-based application service 125 may perform one or more actions in response to the write transaction having been completed successfully. Had the transaction failed, the client device 105 or the cloud-based application service 125 may be notified that the transaction failed and the client device 105 or the cloud-based application service 125 may perform an error processing procedure for handling a failed transaction.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
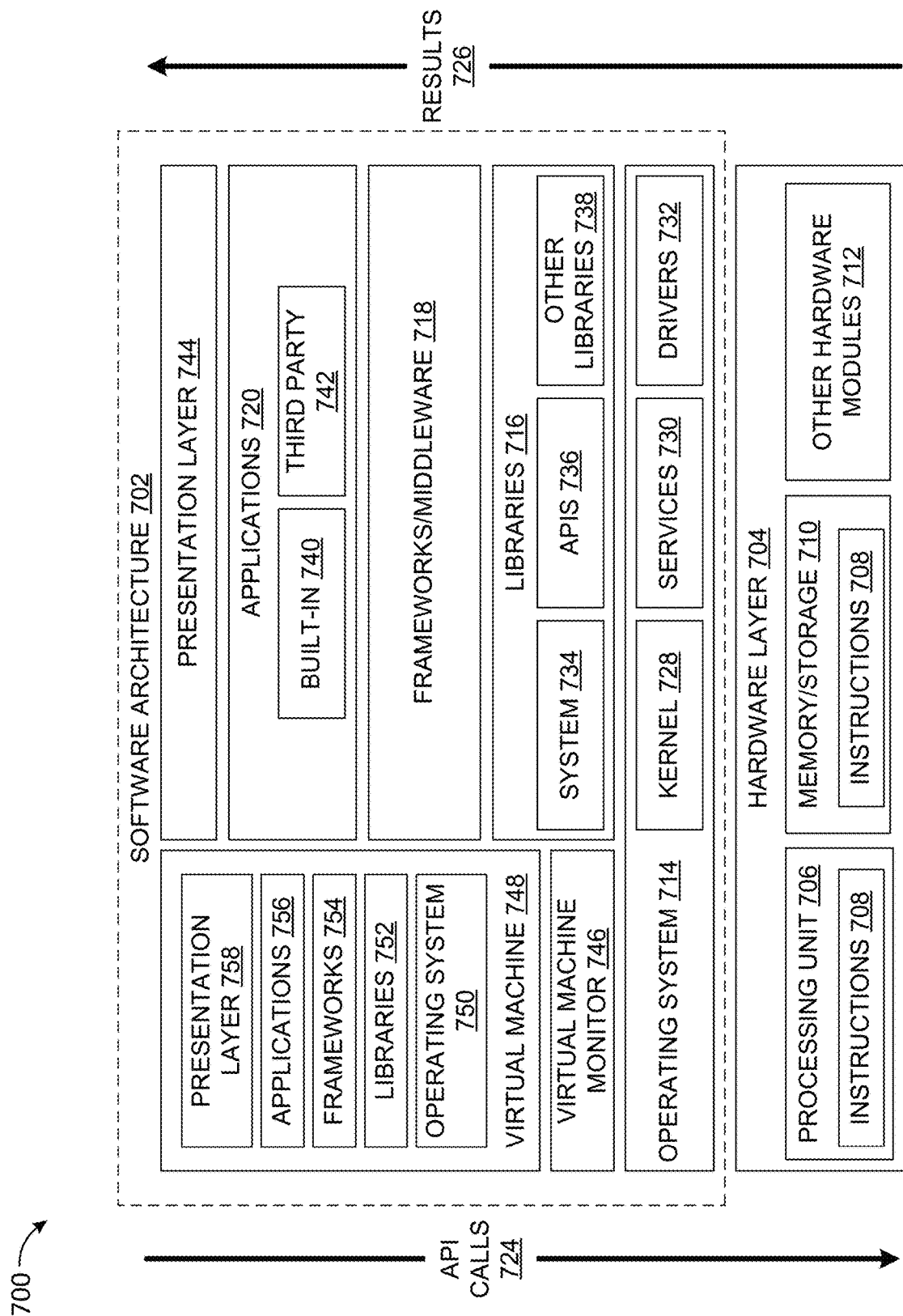
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
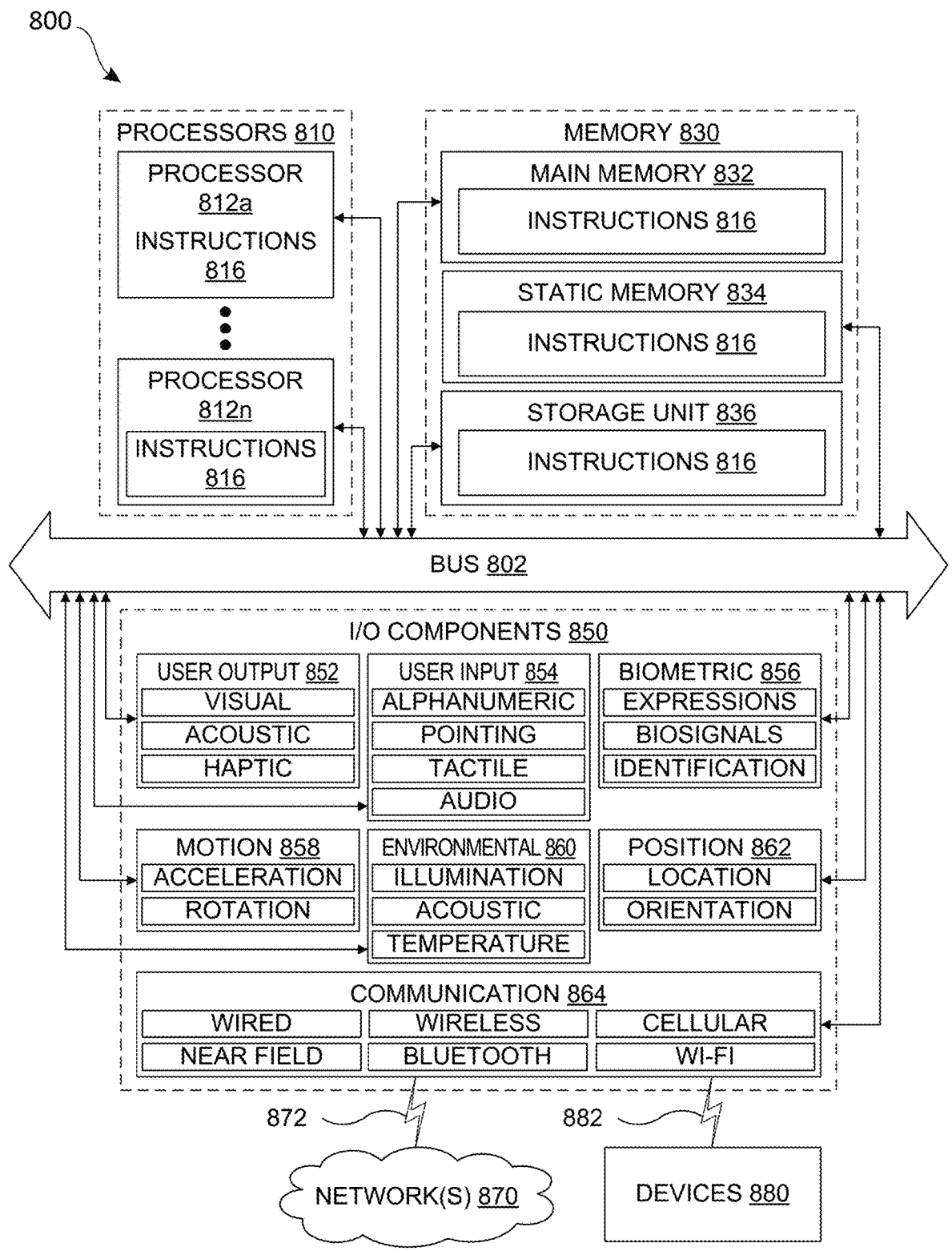
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor to perform operations comprising:
   receiving a request to provision a new database having a plurality of replicas; and
   provisioning the new database including the plurality of replicas, the plurality of replicas comprising a primary replica, one or more secondary replicas, and one or more delta replicas, the primary replica being configured to handle read and write operations, the one or more secondary replicas comprising a copy of data and transactional log information of the primary replica, the one or more secondary replicas being unable to handle write operations but able to handle read operations and count toward a quorum threshold, the one or more delta replicas being a copy of the transactional log information of the primary replica and being unable to handle read operations or write operations but the one or more delta replicas count toward the quorum threshold;
   receiving a write transaction from a client device indicating data to be written to the database;

routing the write transaction to the primary replica;
executing the write transaction on the primary replica;
propagating transaction log information from the primary replica to the one or more secondary replicas and the one or more delta replicas;
updating the data and the transactional log information of the one or more secondary replicas based on the transactional log information propagated by the primary replica;
receiving acknowledgements from the one or more secondary replicas responsive to updating the data and the transactional logs of the one or more secondary replicas;
updating transactional logs of the one or more delta replicas based on the transactional log information propagated by the primary replica;
receiving acknowledgements from the one or more delta replicas in response to updating the transactional logs;
determining that a number of the acknowledgements received from the one or more secondary replicas and the one or more delta replicas satisfies the quorum threshold;
committing the write transaction to make changes to data in the primary replica permanent responsive to the number of acknowledgements satisfying the quorum threshold; and
sending a response to the client device indicating that the write transaction has been completed.

2. The data processing system of claim 1, wherein the instructions configured to cause the process to perform the operation of provisioning the database includes instructions configured to cause the process to perform operations of:
determining resource requirements for the database based on the resource requirements for the primary replica, the one or more secondary replicas, and the one or more delta replicas, wherein the one or more delta replicas require less resource per delta replica than per secondary replica;
selecting a cluster of database servers on which the database is to be created based on the resource requirements for the database and available resources of the cluster of database servers; and
selecting separate nodes of the cluster of database servers to provision each respective replica of the primary replica, the one or more secondary replicas, and the one or more delta replicas.

3. The data processing system of claim 2, wherein the machine-readable medium includes instructions configured to cause the processor to perform operations of:
allocating computing and memory resources for each respective replica on a respective node on which the replica is provisioned, the primary replica and the one or more secondary replicas each being provisioned resources for a full database replica, and the one or more delta replicas being allocated limited computing and storage resources for supporting maintenance of the transaction logs rather than of a full database replica.

4. The data processing system of claim 1, wherein the machine-readable medium includes instructions configured to cause the processor to perform operations of:
determining that the primary replica has failed;
selecting a secondary replica from the plurality of secondary replicas to promote to a new primary replica; and
routing write traffic to the new primary replica.

5. The data processing system of claim 1, wherein the machine-readable medium includes instructions configured to cause the processor to perform operations of:
determining a total number of operational replicas based on a total number of operational replicas of the one or more secondary replicas and a total number of operational replicas of the one or more delta replicas;
determining that the total number of operational replicas does not satisfy the quorum threshold;
temporarily rendering the database inoperable;
initializing one or more new secondary replicas and one or more new delta replicas; and
rendering the database operational once the total number of operational replicas satisfies the quorum threshold.

6. The data processing system of claim 1, wherein the machine-readable medium includes instructions configured to cause the processor to perform operations of:
determining that the primary replica has reached a load threshold;
identifying a respective secondary replica of the one or more secondary replicas that handles read-only transactions; and
routing the read-only transactions to the respective secondary replica rather than to the primary replica.

7. The data processing system of claim 1, wherein the machine-readable medium includes instructions configured to cause the processor to perform operations of:
clearing the transactional log information of the one or more secondary replicas and the transaction log information of the one or more delta replicas responsive to committing the write transaction.

8. A method implemented in a data processing system for provisioning and operating databases, the method comprising:
receiving a request to provision a new database having a plurality of replicas; and
provisioning the new database including the plurality of replicas, the plurality of replicas comprising a primary replica, one or more secondary replicas, and one or more delta replicas, the primary replica being configured to handle read and write operations, the one or more secondary replicas comprising a copy of data and transactional log information of the primary replica, the one or more secondary replicas being unable to handle write operations but able to handle read operations and count toward a quorum threshold, the one or more delta replicas being a copy of the transactional log information of the primary replica and being unable to handle read operations or write operations but the one or more delta replicas count toward the quorum threshold;
receiving a write transaction from a client device indicating data to be written to the database;
routing the write transaction to the primary replica;
executing the write transaction on the primary replica;
propagating transaction log information from the primary replica to the one or more secondary replicas and the one or more delta replicas;
updating the data and the transactional log information of the one or more secondary replicas based on the transactional log information propagated by the primary replica;
receiving acknowledgements from the one or more secondary replicas responsive to updating the data and the transactional logs of the one or more secondary replicas;

updating transactional logs of the one or more delta replicas based on the transactional log information propagated by the primary replica;

receiving acknowledgements from the one or more delta replicas in response to updating the transactional logs;

determining that a number of the acknowledgements received from the one or more secondary replicas and the one or more delta replicas satisfies the quorum threshold;

committing the write transaction to make changes to data in the primary replica permanent responsive to the number of acknowledgements satisfying the quorum threshold; and sending a response to the client device indicating that the write transaction has been completed.

9. The method of claim 8, wherein performing the operation of provisioning the database further comprises:

determining resource requirements for the database based on the resource requirements for the primary replica, the one or more secondary replicas, and the one or more delta replicas, wherein the one or more delta replicas require less resource per delta replica than per secondary replica;

selecting a cluster of database servers on which the database is to be created based on the resource requirements for the database and available resources of the cluster of database servers; and selecting separate nodes of the cluster of database servers to provision each respective replica of the primary replica, the one or more secondary replicas, and the one or more delta replicas.

10. The method of claim 9, further comprising:

allocating computing and memory resources for each respective replica on the respective node on which the replica is provisioned, the primary replica and the one or more secondary replicas each being provisioned resources for a full database replica, and the one or more delta replicas being allocated limited computing and storage resources for supporting maintenance of the transaction logs rather than of a full database replica.

11. The method of claim 8, further comprising:

determining that the primary replica has failed;
selecting a secondary replica from the plurality of secondary replicas to promote to a new primary replica; and
routing write traffic to the new primary replica.

12. The method of claim 8, further comprising:

determining a total number of operational replicas based on a total number of operational replicas of the one or more secondary replicas and a total number of operational replicas of the one or more delta replicas;

determining that the total number of operational replicas does not satisfy the quorum threshold;

temporarily rendering the database inoperable;
initializing one or more new secondary replicas and one or more new delta replicas; and
rendering the database operational once the total number of operational replicas satisfies the quorum threshold.

13. The method of claim 8, further comprising:

determining that the primary replica has reached a load threshold;

identifying a respective secondary replica of the one or more secondary replicas that handles read-only transactions; and routing the read-only transactions to the respective secondary replica rather than to the primary replica.

14. The method of claim 8, further comprising:

clearing the transactional log information of the one or more secondary replicas and the transaction log information of the one or more delta replicas responsive to committing the write transaction.

15. A machine-readable medium on which are stored instructions that, when executed, cause a processor of a programmable device to perform operations of:

receiving a request to provision a new database having a plurality of replicas; and provisioning the new database including the plurality of replicas, the plurality of replicas comprising a primary replica, one or more secondary replicas, and one or more delta replicas, the primary replica being configured to handle read and write operations, the one or more secondary replicas comprising a copy of data and transactional log information of the primary replica, the one or more secondary replicas being unable to handle write operations but able to handle read operations and count toward a quorum threshold, the one or more delta replicas being a copy of the transactional log information of the primary replica and being unable to handle read operations or write operations but the one or more delta replicas count toward the quorum threshold;

receiving a write transaction from a client device indicating data to be written to the database;

routing the write transaction to the primary replica;

executing the write transaction on the primary replica;

propagating transaction log information from the primary replica to the one or more secondary replicas and the one or more delta replicas;

updating the data and the transactional log information of the one or more secondary replicas based on the transactional log information propagated by the primary replica;

receiving acknowledgements from the one or more secondary replicas responsive to updating the data and the transactional logs of the one or more secondary replicas;

updating transactional logs of the one or more delta replicas based on the transactional log information propagated by the primary replica;

receiving acknowledgements from the one or more delta replicas in response to updating the transactional logs;

determining that a number of the acknowledgements received from the one or more secondary replicas and the one or more delta replicas satisfies the quorum threshold;

committing the write transaction to make changes to data in the primary replica permanent responsive to the number of acknowledgements satisfying the quorum threshold; and sending a response to the client device indicating that the write transaction has been completed.

16. The machine-readable medium of claim 15, wherein the instructions configured to cause the processor to perform the operation of provisioning the database includes instructions configured to cause the processor to perform operations of:

determining resource requirements for the database based on the resource requirements for the primary replica, the one or more secondary replicas, and the one or more delta replicas, wherein the one or more delta replicas require less resource per delta replica than per secondary replica;

selecting a cluster of database servers on which the database is to be created based on the resource requirements for the database and available resources of the cluster of database servers; and selecting separate nodes of the cluster of database servers to provision each respective replica of the primary replica, the one or more secondary replicas, and the one or more delta replicas.

17. The machine-readable medium of claim 16, further comprising instructions configured to cause the processor to perform operations of:

allocating computing and memory resources for each respective replica on a respective node on which the replica is provisioned, the primary replica and the one or more secondary replicas each being provisioned resources for a full database replica, and the one or more delta replicas being allocated limited computing and storage resources for supporting maintenance of the transaction logs rather than of a full database replica.

\* \* \* \* \*